United States Patent [19]

Piber

Best Available Copy

[11] E Re. 30,270

[45] Reissued May 6, 1980

[54] OFF LOCKING IN-LINE TRIGGER SWITCH

[75] Inventor: Earl T. Piber, Oconomowoc, Wis.

[73] Assignee: Eaton Corporation, Cleveland, Ohio

[21] Appl. No.: 955,208

[22] Filed: Oct. 26, 1978

Related U.S. Patent Documents

Reissue of:

[64] Patent No.: 3,872,274
Issued: Mar. 18, 1975
Appl. No.: 448,413
Filed: Mar. 5, 1974

U.S. Applications:

[62] Division of Ser. No. 316,343, Dec. 18, 1972, Pat. No. 3,829,645.

[51] Int. Cl.[2] ..... H01H 3/20

[52] U.S. Cl. ..... 200/157; 200/321; 200/328

[58] Field of Search ..... 200/157, 321, 322, 325, 200/328, 42 R, 427

[56] References Cited

U.S. PATENT DOCUMENTS

| | | | |
|---|---|---|---|
| 3,132,227 | 5/1964 | Butler | 200/157 |
| 3,194,084 | 7/1965 | Filander | 200/157 X |
| 3,329,789 | 7/1967 | Sahrbacker | 200/157 |
| 3,626,118 | 12/1971 | Botefuhr et al. | 200/157 X |
| 3,662,136 | 5/1972 | Bienwald et al. | 200/157 |
| 3,746,815 | 7/1973 | Drummer | 200/328 |

*Primary Examiner*—Stephen Marcus

*Attorney, Agent, or Firm*—Hugh R. Rather; William A. Autio

[57] ABSTRACT

A trigger switch for portable tools such as circular saws, chain saws, and the like having a return-spring biased trigger that is actuated by the forefinger of the user to turn the tool on and upon release returns to and locks in off position under spring action. The trigger switch which may be of the inline or pivoted (overhanging) type is provided with a built-in spring biased lock that automatically locks the trigger whenever the trigger returns to its off position. A manual release button is arranged to be depressed by the thumb of the user to release the lock and allow reactuation of the trigger. The lock-off feature is characterized by a strong lock to prevent forcing and requiring only minimum modification of the conventional trigger switches.

1 Claim, 7 Drawing Figures

OFF LOCKING IN-LINE TRIGGER SWITCH

Matter enclosed in heavy brackets [ ] appears in the original patent but forms no part of this reissue specification; matter printed in italics indicates the additions made by reissue.

CROSS REFERENCE TO RELATED APPLICATION

This is a division of application Ser. No. 316,343, filed Dec. 18, 1972, now U.S. Pat. No. 3,829,645, Aug. 13, 1974.

BACKGROUND OF THE INVENTION

Off locks for trigger switches have been known heretofore.

In one version disclosed in assignee's M. R. Dummer copending application Ser. No. 195,167, filed Nov. 3, 1971, now U.S. Pat. No. 3,746,815, dated July 17, 1973, a rectangular (or oblong) locking plate on the inner end of the release button shaft cooperates with a shoulder and adjacent slot within an in-line (lineraly slidable) trigger. The forward end of this plate abuts the shoulder to lock the trigger in off position. With the release button depressed, this plate moves clear of the shoulder and the slot provides clearance for the forward end thereof (the locking plate being attached near its rear end to the release button shaft, that is, eccentrically) to allow actuation of the trigger to on position.

In another version disclosed in the aforementioned copending application, a generally similar oblong locking plate enters a complementary aperture in an overhanging (pivoted) trigger, and clears this aperture upon depression of the release button to allow actuation of the trigger, the trigger having guides adjacent this aperture to prevent rotation of the eccentric locking plate out of alignment with the aperture.

This invention relates to improvements thereover.

SUMMARY OF THE INVENTION

This invention relates to off locking switches for portable tools and more particularly to automatically-engaging manual-release off locking trigger switches.

An object of the invention is to provide an improved, self-enclosed off locking trigger switch.

A more specific object of the invention is to provide improved off locking switches of the in-line trigger type that requires minimum modification to provide the off locking feature.

Another specific object of the invention is to provide off locking trigger switches that are simple in construction and assembly, and strong enough and effective in operation to positively prevent forcing.

Other objects and advantages of the invention will hereinafter appear.

DESCRIPTION OF THE PREFERRED EMBODIMENT

Figure 1:
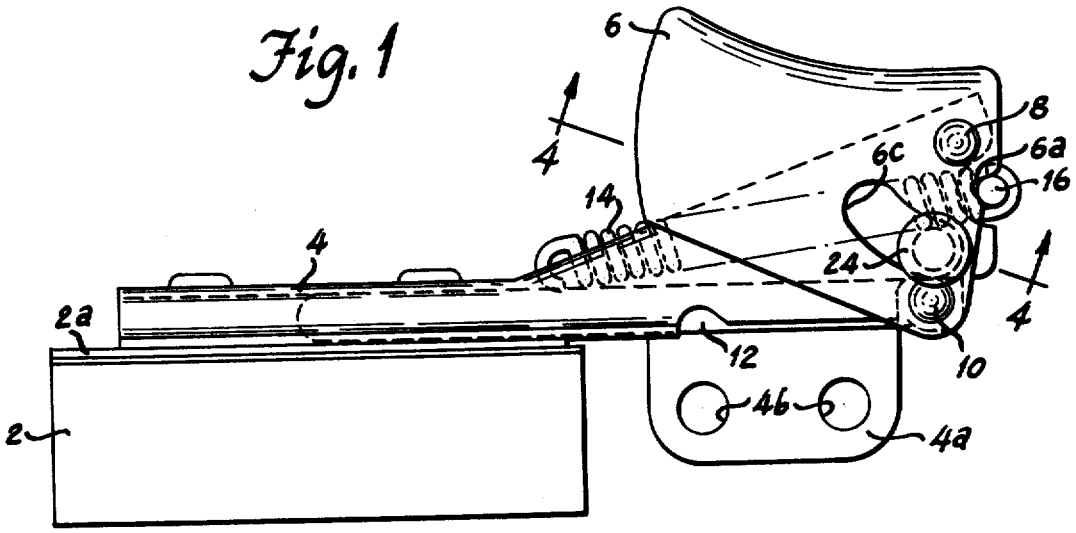
FIG. 1 is an enlarged left side elevational view of a first embodiment of an off locking trigger switch of the overhanging trigger type.

Referring to FIG. 1, there is shown an off locking trigger switch of the overhanging (pivoted) trigger type. This switch is provided with an insulating base 2 and a metal frame 4 supporting a trigger 6 that is the switch operator. The trigger is pivotally supported on the frame by a rivet 8 at the upper right-portion of the trigger as seen in FIG. 1. A second rivet 10 at the lower right-hand portion of the trigger pivotally connects the trigger to an elongated switch actuator 12. A helical tension spring 14 is hooked at its rear end onto the frame and is coupled at its front end through an anchor pin 16 to the trigger.

Figure 2:
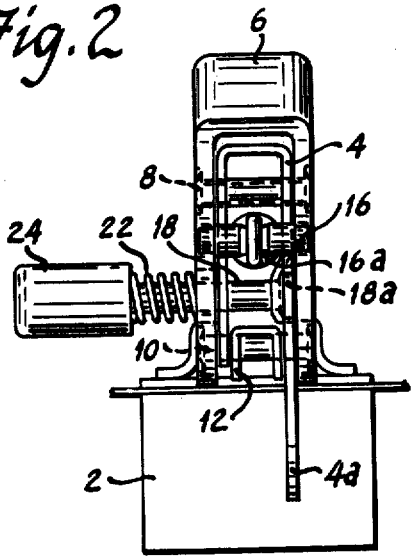
FIG. 2 is a front end elevational view of the switch of FIG. 1.

As shown in FIGS. 1 and 2, the base is a generally rectangular housing having an open top and terminals (not shown) preferably at opposite ends for connecting the switch contacts housed therein to an external circuit that the switch is adopted to control, such as the motor control circuit of a portable saw. An insulating plate 2a covers the base and is provided with a suitable opening through which the switch is actuated.

Frame 4 is generally inverted U-shaped substantially throughout its rear half overlying the base to provide a clearance channel for longitudinally movable, elongated switch actuator 12 that extends from about the center of the base all the way to rivet 10. The front half of the frame is also inverted U-shaped as shown in FIGS. 2 and 4 but of increasing height towards the front end thereof as shown in FIG. 1. A skirt 4a hangs down from the right side of the frame as seen in FIGS. 1–3 and is provided with a pair of holes 4b whereby the switch may be mounted into the handle of a portable tool.

The trigger 6 is also of inverted U-shaped construction but wider than the frame as shown in FIGS. 1, 2 and 4 so that it embraces and pivots freely on the front end portion of the frame. The forward edges of the trigger are provided with alinged notches 6a shown in FIGS. 1 and 3 for retaining the reduced diameter end portions of anchor pin 16. The center portion of this anchor pin may be provided with a reduced tapered section 16a shown in FIG. 2 for centering the hook of the trigger-return spring. The rear end of the spring is hooked in a hole in the frame and the frame is provided with an elongated aperture along the top thereof toward the front from this hole to afford clearance for the spring.

The off-locking mechanism comprises a spring-biased locking member mounted on the frame and comprises suitable apertures in the trigger for locking the trigger and for allowing movement of the trigger when the off-lock is released. This spring-biased locking member comprises a steel lock pin 18 shown in FIG. 2 having an enlarged circular right-hand end portion 18a shown in FIG. 3 serving as a locking detent. While an integral enlarged end portion 18a has been shown, it will be apparent that alternatively a circular locking disc may be rigidly secured to the right-hand end of pin 18 as by riveting, welding, or the like.

Figure 3:
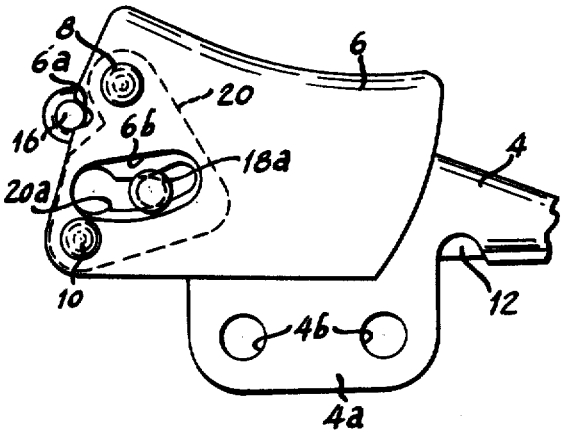
FIG. 3 is a fragmentary right side elevational view of the trigger portion of the switch of FIGS. 1 and 2.
Figure 4:
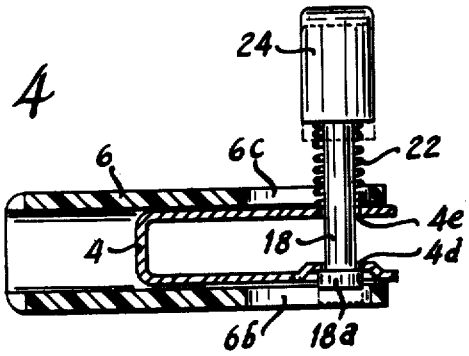
FIG. 4 is a cross-sectional view taken along line 4—4 of FIG. 1.

A locking plate 20 shown in broken line in FIG. 3 is secured to the right inner wall of the trigger, that is, between the trigger and the frame, by rivets 8 and 10. This locking plate is generally triangular in outline with a notch to provide clearance for notch 6a in the trigger. This locking plate is provided with a generally keyhole-shaped curved aperture 20a for cooperation with the enlarged round end portion 18a of lock pin 18.

The trigger is provided with apertures on both sides to provide clearance for the lock pin including a generally oblong slightly arcuate aperture 6b for providing clearance for the enlarged end portion 18a of the lock pin and a generally oblong slightly arcuate aperture 6c on the left-hand side of the trigger providing clearance for the lock pin shaft.

To assemble the lock pin, the left-hand end thereof is inserted through aperture 6b in the trigger, then through aperture 20a in the lock plate, then through a small round hole 4d in the right-hand side of the frame, then through a similar small round hole 4e in the left-hand side of the frame, FIG. 4, and finally through aperture 6c in the left-hand side of the trigger. A helical compression spring 22 is then placed over the lock pin and button 24 is secured to the left-hand end of the lock pin to retain spring 22 and to provide a pushbutton for depression by the thumb of the user.

As shown in FIG. 4, the area surrounding hole 4d in the right-hand side of the frame is upset inwardly to cause locking plate 20 to engage the midportion of enlarged end 18a of the lock pin and not slip beneath it against the lock pin shaft.

When the trigger is released from the depressed position shown in FIG. 3, return spring 14 normally biases it into its off position shown in FIG. 1. As a result, bias spring 22 biases the lock pin into its locking position with enlarged round end portion 18 keyhole-shaped having entered the enlarged round, complementary end portion of keyhole-shaped aperture 20a in the locking plate. The end portion of the lock pin being round and the enlarged end portion of this keyhole-shaped aperture being round, the lock will engage whenever the trigger returns to off position regardless of any rotation of the lock pin. The lock pin will engage both sides of the apertures to prevent forcing.

To release the lock, the user's thumb depresses the release button against the force of bias spring 22 as shown in dotted lines in FIG. 4. As a result, the lock pin lifts its enlarged head 18a clear of the round end portion of aperture 20a in the locking plate as shown in dotted lines in FIG. 4, thus allowing pivotal depression of the trigger to "on" position. After the trigger is slightly depressed, the release button may be released as the enlarged end of the lock pin cannot enter the narrow portion of keyhole-shaped aperture in the locking plate. This narrow portion of the locking aperture provides clearance for the lock pin shaft when the trigger is depressed to "on" position. When the trigger is released, spring 14 returns the trigger to off position and spring 22 snaps the lock into engagement.

Figure 5:
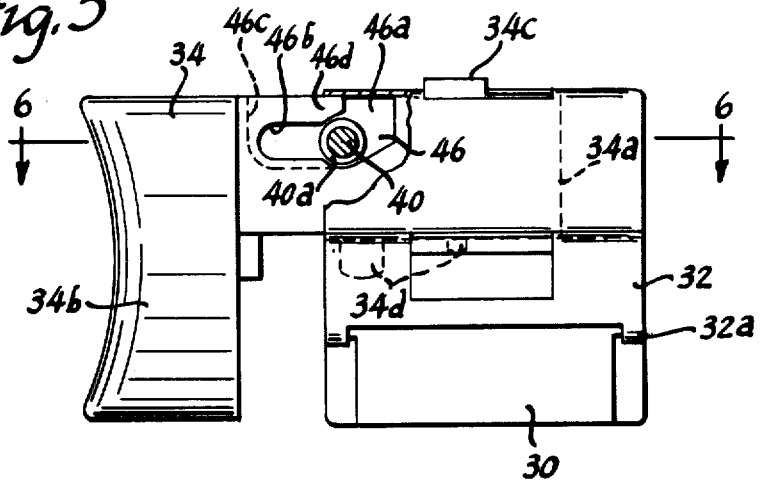
FIG. 5 is an enlarged left side elevational view of a second embodiment of an off locking trigger switch of the in-line trigger type.
Figure 6:
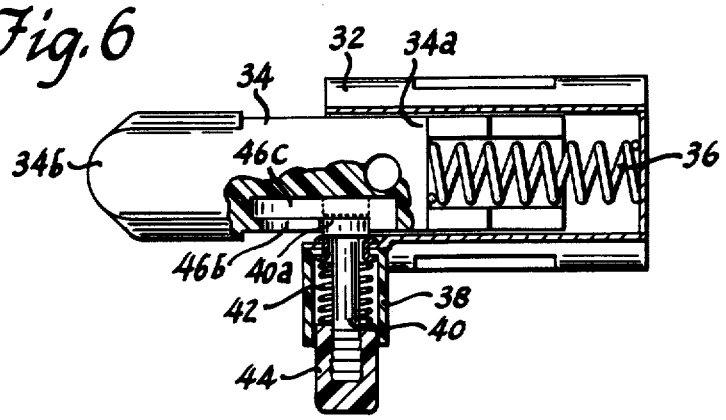
FIG. 6 is a top view partly in section along line 6—6 of FIG. 5.
Figure 7:
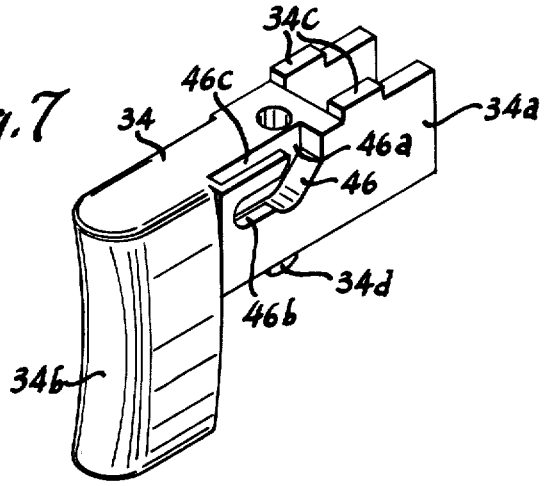
FIG. 7 is an isometric view of the trigger of the switch of FIGS. 5 and 6.

Referring to FIGS. 5, 6 and 7, there is shown an off locking trigger switch of the in-line trigger type. This switch is provided with an insulating base 30 and a metal frame 32 clamping a trigger 34 to the top of the base for in-line sliding movement thereon. While a metal frame has been shown for illustrative purposes, it could be made of other material and might be formed as an integral part of the base and having sufficient resiliency to allow insertion of the trigger therewithin. As shown in FIG. 6, the trigger is held in its forwardly extended "off" position by a helical compression spring 36 that is compressed when the trigger is depressed by the forefinger of the user to operate the switch and, when the pulling force on the trigger is relieved, returns the trigger to its "off" position.

Base 30 may be conventional in structure and arranged to house switch contacts for operation by the trigger, such as for example, the base shown in R. G. Miller U.S. Pat. No. 3,242,298 dated Mar. 22, 1966.

The frame is provided with tabs 32a at the lower corners of its two skirts that are bent inwardly into recesses at the corners of the base to secure the frame to the base.

The frame is provided with means for mounting an off lock pin. This means comprises a bushing 38 at the upper forward portion of the left side of the frame. This bushing, which is similar to the conventional on lock pin bushing, is secured over a hole in the frame by a tubular rivet or the like so that the stem of a lock pin 40 can extend therethrough. This lock pin is provided with a short cylindrical enlarged head 40a on its inner end, is surrounded by a helical compression 42 within the bushing, and has secured to its outer end a pushbutton 44 whereby the locking pin may be depressed by the thumb of the right hand of the user.

The trigger 34 is provided with a linearly slidable, inline portion 34a and a forefinger engaging portion 34b most clearly shown in FIG. 7. The conventional pair of stops 34c are provided at the top of slidable portion 34a to extend up through rectangular apertures at the top of the frame. These stops limit the movement of the trigger. Movable contact actuator means 34d is shown at the bottom of the slidable portion.

The trigger is also provided, at its left side and at the forward part of its slidable portion, with a locking slot 46. This slot has a vertical opening 46a at the top of the trigger through which head 40a of the locking pin may be inserted when the trigger is assembled onto the frame. This slot also has a forwardly extending narrow channel 46b extending from the vertical opening, this channel being wide enough to allow the stem of the locking pin to pass but which stops the head 40a of the locking pin at its mouth as shown in FIG. 5. This narrow channel and vertical opening are immediately adjacent the left side of the trigger.

This locking slot also has a larger channel 46c large enough to allow the head of the locking pin to pass. This larger channel is immediately adjacent the narrow channel and deeper within the trigger requiring depressing of the locking pin to enable its enlarged head to enter therein.

From the foregoing, it will be apparent that when the trigger returns to its off position, enlarged head 40a of the locking pin snaps into the locking position shown in FIG. 5 under the action of bias spring 42. Therefore, in order to reoperate the switch, the operator must first depress button 44 to move head 40a of the locking pin from the mouth of channel 46b into channel 46c. When the lock release button is held so depressed, the trigger may be depressed to close the switch. As the trigger is slightly depressed, the lock release button 44 may be released and the locking pin will be held by its head 40a in its depressed position. Then when the trigger is released and allowed to return to its off position under the force of return spring 36, bias spring 42 snaps the locking pin back into locking position shown in FIGS. 5 and 6.

Referring to FIG. 5, it will be seen that the invention is characterized by a locking mechanism of great strength that positively prevents forcing of the trigger when it is locked. For this purpose, the head of the locking pin engages and positively stops against both the lower and upper sides of the mouth of channel 46b. Since part 46d of the trigger directly above the mouth of channel 46b abuts the rear roof of the frame as shown in FIG. 5, the mouth of the narrow channel cannot be spread to receive the head of the locking pin, and therefore, the locking pin cannot be forced by pulling on the trigger. Also, the force is applied to the locking pin symmetrically from both sides of the mouth of the narrow channel so that the effective force is applied to the axis of the locking pin when the locked trigger is pulled. Thus, there is no tendency to apply any torque to the locking pin which, if present, would weaken its locking ability.

While the invention hereinbefore described is effectively adapted to fulfill the objects stated, it is to be understood that I do not intend to restrict my invention to the particular preferred embodiments of off locking trigger switches disclosed, inasmuch as they are susceptible of various modifications without departing from the scope of the appended claims.

I claim:

1. A self-enclosed trigger switch for a portable electric tool affording intended operation of the tool but automatically locking it against accidental operation whenever the switch is released comprising:

an insulating housing for the switch mechanism;

a trigger mounted to said housing for limited reciprocal sliding movement between an "on" position wherein the switch is in operation and an "off" position wherein the switch is not in operation;

a frame mounting said trigger to the top of said housing;

a return spring normally biasing said trigger into its extended "off" position and being depressible into its "on" position;

and an automatically engaging off lock for said trigger comprising:

a locking recess in the left side of said trigger having a keyhole shaped first depth forming a locking slot and a larger second depth forming a clearance slot for release of the lock;

a spring-biased locking pin mounted on the left side of said frame for limited axial movement with the right end thereof extending into said recess and the left end thereof having a pushbutton that is accessible for depression by the right hand thumb of the user;

a symmetrical enlarged locking head on said right end of said locking pin disposed within said recess;

said recess having an opening extending up to the top of the trigger affording access for said enlarged locking head on assembly of the trigger switch;

said locking slot being keyhole shaped so as to have a narrow section just wide enough to receive the stem of said locking pin but not the enlarged head thereof and a wider mouth portion at the entrance to said narrow section for receiving said enlarged head whereby said enlarged head abuts both sides of [side] *said* mouth to lock said trigger in its "off" position and said locking pin *pushbutton must be depressed against the force of its bias* spring to move the stem of said pin adjacent the narrow section of said locking slot and said enlarged head into said clearance slot to allow movement of said trigger to "on" position;

and the part of said trigger defining the upper side of said locking slot being at least partly confined against said frame to strengthen said off lock.

* * * * *